United States Patent
Mestha et al.

(10) Patent No.: US 10,678,912 B2
(45) Date of Patent: Jun. 9, 2020

(54) DYNAMIC NORMALIZATION OF MONITORING NODE DATA FOR THREAT DETECTION IN INDUSTRIAL ASSET CONTROL SYSTEM

(71) Applicant: General Electric Company, Schenectady, NY (US)

(72) Inventors: Lalit Keshav Mestha, North Colonie, NY (US); Cody Joe Bushey, Clifton Park, NY (US); Daniel Francis Holzhauer, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 151 days.

(21) Appl. No.: 15/351,809

(22) Filed: Nov. 15, 2016

(65) Prior Publication Data

US 2018/0137277 A1    May 17, 2018

(51) Int. Cl.
    *H04L 29/06* (2006.01)
    *G06F 21/55* (2013.01)
    *G05B 23/02* (2006.01)

(52) U.S. Cl.
    CPC ....... *G06F 21/554* (2013.01); *G05B 23/0205* (2013.01); *H04L 63/14* (2013.01); *G05B 2219/45103* (2013.01)

(58) Field of Classification Search
    CPC ............. H04L 63/1433; H04L 63/1408; G06F 21/577; G06F 21/554; G06F 21/55; G06F 21/566
    See application file for complete search history.

(56) References Cited

U.S. PATENT DOCUMENTS

| 4,455,614 A | 6/1984 | Martz et al. |
| 7,818,276 B2 | 10/2010 | Veillette et al. |
| 8,468,244 B2 | 6/2013 | Redlich et al. |

(Continued)

OTHER PUBLICATIONS

Vanini et al., "Fault detection and isolation of a dual spool gas turbine engine using dynamic neural networks and multiple model approach", Feb. 20, 2014, ScienceDirect, vol. 259, pp. 234-251 (Year: 2014).*

*Primary Examiner* — Taghi T Arani
*Assistant Examiner* — Lin Chang
(74) *Attorney, Agent, or Firm* — Buckley, Maschoff & Talwalkar LLC

(57) ABSTRACT

Operation of an industrial asset control system may be simulated or monitored under various operating conditions to generate a set of operating results. Subsets of the operating results may be used to calculate a normalization function for each of a plurality of operating conditions. Streams of monitoring node signal values over time may be received that represent a current operation of the industrial asset control system. A threat detection platform may then dynamically calculate normalized monitoring node signal values based at least in part on a normalization function in an operating mode database. For each stream of normalized monitoring node signal values, a current monitoring node feature vector may be generated and compared with a corresponding decision boundary for that monitoring node, the decision boundary separating normal and abnormal states for that monitoring node. A threat alert signal may then be automatically transmitted based on results of those comparisons.

15 Claims, 13 Drawing Sheets

(56) References Cited

U.S. PATENT DOCUMENTS

| | | |
|---|---|---|
| 8,756,047 B2 | 6/2014 | Patel |
| 8,849,737 B1 | 9/2014 | Engler |
| 8,973,124 B2 | 3/2015 | Chong et al. |
| 9,046,886 B2 | 6/2015 | Chong et al. |
| 9,384,885 B2 | 7/2016 | Karalis et al. |
| 9,397,997 B2 | 7/2016 | Chong et al. |
| 9,405,900 B2 | 8/2016 | Dixit et al. |
| 2008/0288330 A1* | 11/2008 | Hildebrand ............ G06Q 10/06 705/7.28 |
| 2013/0204664 A1* | 8/2013 | Romagnolo ....... G06Q 30/0203 705/7.32 |
| 2013/0291115 A1 | 10/2013 | Chong et al. |
| 2014/0107521 A1* | 4/2014 | Galan ................ A61B 5/04008 600/544 |
| 2014/0201780 A1* | 7/2014 | Wong .................. H04N 21/482 725/32 |
| 2014/0297635 A1* | 10/2014 | Orduna .................. H04L 63/10 707/736 |
| 2014/0337973 A1* | 11/2014 | Foster ..................... H04L 63/14 726/22 |
| 2014/0359708 A1 | 12/2014 | Schwartz |
| 2015/0095003 A1* | 4/2015 | Horowitz ........... G05B 23/0254 703/6 |
| 2015/0249864 A1* | 9/2015 | Tang .................. H04N 21/4661 725/28 |
| 2015/0346706 A1* | 12/2015 | Gendelman .......... G05B 19/058 700/79 |
| 2016/0033941 A1 | 2/2016 | T et al. |
| 2016/0212100 A1* | 7/2016 | Banerjee ............ H04L 63/0281 |
| 2016/0222816 A1* | 8/2016 | Chen ....................... F01D 17/04 |
| 2016/0341636 A1* | 11/2016 | Rajaram ............. G01M 99/008 |
| 2017/0052960 A1* | 2/2017 | Alizadeh-Shabdiz ....................... G06F 17/30598 |
| 2017/0054751 A1* | 2/2017 | Schneider ........... H04L 63/1425 |

\* cited by examiner

DYNAMIC NORMALIZATION OF MONITORING NODE DATA FOR THREAT DETECTION IN INDUSTRIAL ASSET CONTROL SYSTEM

BACKGROUND

Industrial asset control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of a control system and may cause a total shut down or even catastrophic damage to a plant. Currently, Fault Detection Isolation and Accommodation ("FDIA") approaches only analyze sensor data, but a threat might occur in connection with other types of threat monitoring nodes. Also note that FDIA is limited only to naturally occurring faults in one sensor at a time. FDIA systems do not address multiple simultaneously occurring faults as in the case of malicious attacks. Moreover, an industrial asset control system may be associated with non-linear operations over a range of operating parameters (e.g., loads, temperatures, etc.). As a result, data variations can be substantial and determining when a cyber threat is present based on operation of the control system may be difficult. It would therefore be desirable to protect an industrial asset control system from cyber threats in an automatic and accurate manner.

SUMMARY

According to some embodiments, operation of an industrial asset control system is monitored under various operating conditions to generate a set of operating results. Subsets of the operating results may be used to calculate a normalization function for each of a plurality of operating conditions. Streams of monitoring node signal values over time may be received that represent a current operation of the industrial asset control system. A threat detection platform may then dynamically calculate normalized monitoring node signal values based at least in part on a normalization function in the operating mode database. For each stream of normalized monitoring node signal values, a current monitoring node feature vector may be generated and compared with a corresponding decision boundary for that monitoring node, the decision boundary separating a normal state from an abnormal state for that monitoring node. A threat alert signal may then be automatically transmitted based on results of said comparisons.

Some embodiments comprise: means for monitoring operation of the industrial asset control system under various operating conditions to generate a set of operating results; means for calculating a normalization function for each of a plurality of operating conditions; means for receiving streams of monitoring node signal values over time that represent a current operation of the industrial asset control system; means for dynamically calculating normalized monitoring node signal values based at least in part on a normalization function in the operating mode database; for each stream of normalized monitoring node signal values, means for generating a current monitoring node feature vector; means for comparing each generated current monitoring node feature vector with a corresponding decision boundary for that monitoring node, the decision boundary separating a normal state from an abnormal state for that monitoring node; and means for automatically transmitting a threat alert signal based on results of said comparisons.

Some technical advantages of some embodiments disclosed herein are improved systems and methods to protect an industrial asset control system from cyber threats in an automatic and accurate manner.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
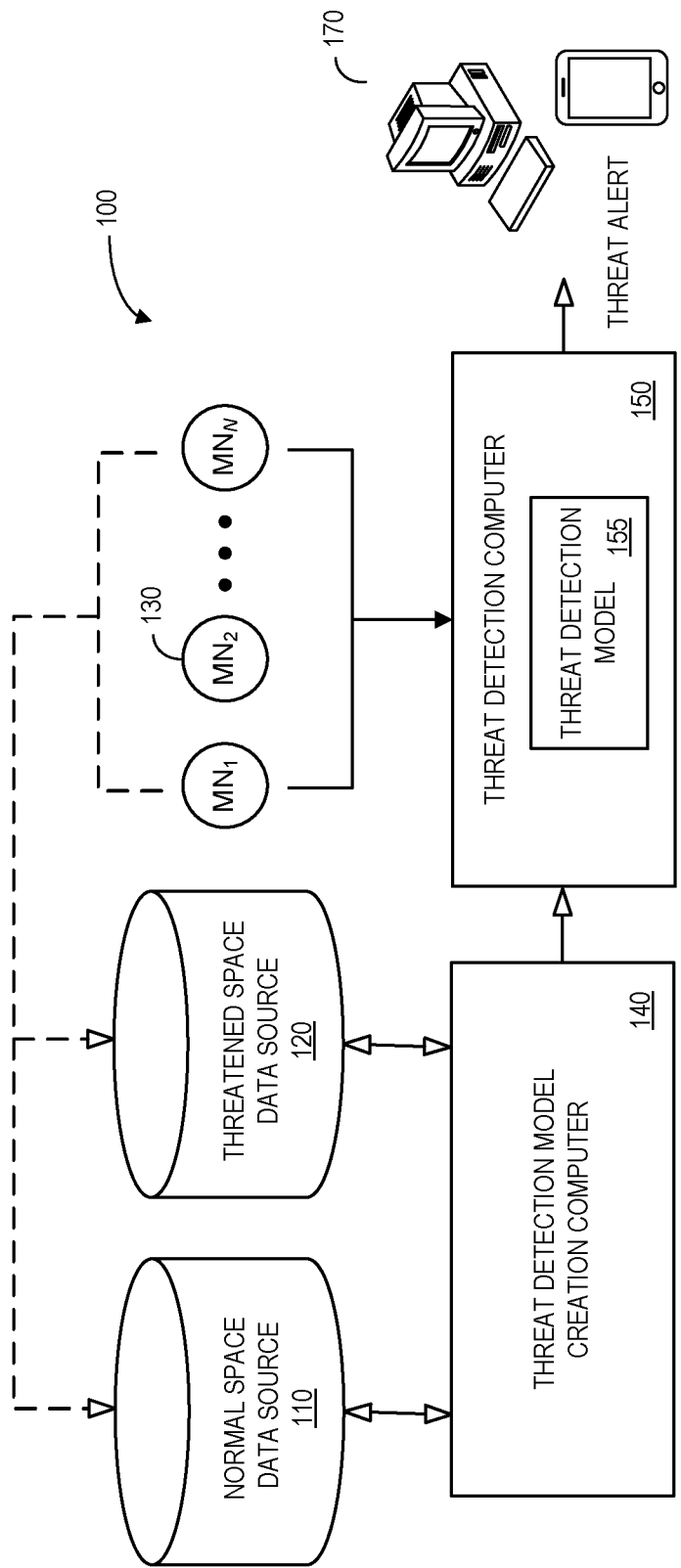
FIG. 1 is a high-level block diagram of a system that may be provided in accordance with some embodiments.

Industrial control systems that operate physical systems are increasingly connected to the Internet. As a result, these control systems may be vulnerable to threats and, in some cases, multiple attacks may occur simultaneously. Existing approaches to protect an industrial control system, such as FDIA approaches, may not adequately address these threats—especially when multiple, simultaneous attacks occur. It would therefore be desirable to protect an industrial asset control system from cyber threats in an automatic and accurate manner. FIG. 1 is a high-level architecture of a system 100 in accordance with some embodiments. The system 100 may include a "normal space" data source 110 and a "threatened space" data source 120. The normal space data source 110 might store, for each of a plurality of "monitoring nodes" 130, a series of normal values over time that represent normal operation of an industrial asset control system (e.g., generated by a model or collected from actual monitoring node 130 data as illustrated by the dashed line in FIG. 1). As used herein, the phrase "monitoring node" might refer to, for example, sensor data, signals sent to actuators, motors, pumps, and auxiliary equipment, intermediary parameters that are not direct sensor signals not the signals sent to auxiliary equipment, and/or control logical(s). These may represent, for example, threat monitoring nodes that receive data from the threat monitoring system in a continuous fashion in the form of continuous signals or streams of data or combinations thereof. Moreover, the nodes may be used to monitor occurrences of cyber-threats or abnormal events. This data path may be designated specifically with encryptions or other protection mechanisms so that the information may be secured and cannot be tampered with via cyber-attacks. The threatened space data source 120 might store, for each of the monitoring nodes 130, a series of threatened values that represent a threatened operation of the industrial asset control system (e.g., when the system is experiencing a cyber-attack).

Information from the normal space data source 110 and the threatened space data source 120 may be provided to a threat detection model creation computer 140 that uses this data to create a decision boundary (that is, a boundary that separates normal behavior from threatened behavior). The decision boundary may then be used by a threat detection computer 150 executing a threat detection model 155. The threat detection model 155 may, for example, monitor streams of data from the monitoring nodes 130 comprising data from sensor nodes, actuator nodes, and/or any other critical monitoring nodes (e.g., monitoring nodes $MN_1$ through $MN_N$), calculate a "feature" for each monitoring node based on the received data, and "automatically" output a threat alert signal to one or more remote monitoring devices 170 when appropriate (e.g., for display to a user). According to some embodiments, a threat alert signal might be transmitted to a unit controller, a plant Human-Machine Interface ("HMI"), or to a customer via a number of different transmission methods. Note that one receiver of a threat alert signal might be a cloud database that correlates multiple attacks on a wide range of plant assets. As used herein, the term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. Moreover, term "automatically" may refer to, for example, actions that can be performed with little or no human intervention. According to some embodiments, information about a detected threat may be transmitted back to the industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data stores, such as the normal space data source 110 and/or the threatened space data source 120. The various data sources may be locally stored or reside remote from the threat detection model creation computer 140 (which might be associated with, for example, offline or online learning). Although a single threat detection model creation computer 140 is shown in FIG. 1, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the threat detection model creation computer 140 and/or threat detection computer 150.

Figure 2:
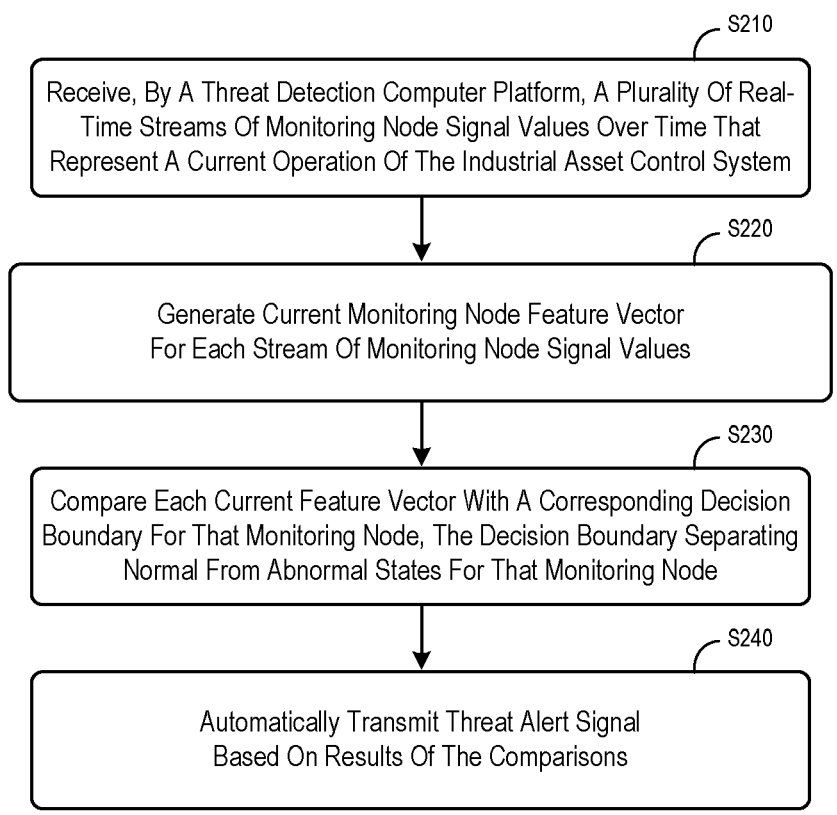
FIG. 2 is a method according to some embodiments.

For example, FIG. 2 illustrates a method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a plurality of real-time monitoring node signal inputs may receive streams of monitoring node signal values over time that represent a current operation of an industrial asset control system. At least one of the monitoring nodes (e.g., control nodes, etc.) may be associated with, for example, sensor data, an auxiliary equipment input signal, a control intermediary parameter, and/or a control logic value.

At S220, a threat detection computer platform may receive the streams of monitoring node signal values and, for each stream of monitoring node signal values, generate a current monitoring node feature vector. According to some embodiments, at least one of the current monitoring node feature vectors is associated with principal components, statistical features, deep learning features, frequency domain features, time series analysis features, logical features, geographic or position based locations, and/or interaction features.

At S230, each generated current monitoring node feature vector may be compared to a corresponding decision boundary (e.g., a linear boundary, non-linear boundary, multi-dimensional boundary, etc.) for that monitoring node, the decision boundary separating a normal state from an abnormal state for that monitoring node. According to some embodiments, at least one monitoring node is associated with a plurality of multi-dimensional decision boundaries and the comparison at S230 is performed in connection with each of those boundaries. Note that a decision boundary might be generated, for example, in accordance with a feature-based learning algorithm and a high fidelity model or a normal operation of the industrial asset control system. Moreover, at least one decision boundary may exist in a multi-dimensional space and be associated with a dynamic model, design of experiments such as, a full factorial design, Taguchi screening design, a central composite methodology, a Box-Behnken methodology, and a real-world operating conditions methodology. In addition, a threat detection model associated with a decision boundary might, according to some embodiments, be dynamically adapted based on a transient condition, a steady state model of the industrial asset control system, and/or data sets obtained while operating the system as in self-learning systems from incoming data stream.

At S240, the system may automatically transmit a threat alert signal (e.g., a notification message, etc.) based on results of the comparisons performed at S230. The threat might be associated with, for example, an actuator attack, a controller attack, a monitoring node attack, a plant state attack, spoofing, financial damage, unit availability, a unit trip, a loss of unit life, and/or asset damage requiring at least one new part. According to some embodiments, one or more response actions may be performed when a threat alert signal is transmitted. For example, the system might automatically shut down all or a portion of the industrial asset control system (e.g., to let the detected potential cyber-attack be further investigated). As other examples, one or more parameters might be automatically modified, a software application might be automatically triggered to capture data and/or isolate possible causes, etc. Note that a thread alert signal might be transmitted via a cloud-based system, such as the PREDIX® field agent system. Note that according to some embodiments, a cloud approach might also be used to archive information and/or to store information about boundaries.

According to some embodiments, the system may further localize an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a control system by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Thus, some embodiments may provide an advanced anomaly detection algorithm to detect cyber-attacks on, for example, key gas turbine control sensors. The algorithm may identify which signals(s) are being attacked using control signal-specific decision boundaries and may inform a control system to take accommodative actions. In particular, a detection and localization algorithm might detect whether a sensor, auxiliary equipment input signal, control intermediary parameter, or control logical are in a normal or anomalous state. Some examples of gas turbine monitoring nodes that might be analyzed include: critical control sensors (e.g., a generator power transducer signal, a gas turbine exhaust temperature thermocouple signal, a gas turbine speed signal, etc.); control system intermediary parameters (e.g., generator power, gas turbine exhaust temperature, compressor discharge pressure, compressor discharge temperature, compressor pressure ratio, fuel flow, compressor inlet temperature, guide vane angle, fuel stroke reference, compressor bleed valve, inlet bleed heat valve, etc.); auxiliary equipment input signals (e.g., signals sent to actuators, motors, pumps, etc.); and/or logical commands to controller.

Some embodiments of the algorithm may utilize feature-based learning techniques based on high fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 3:
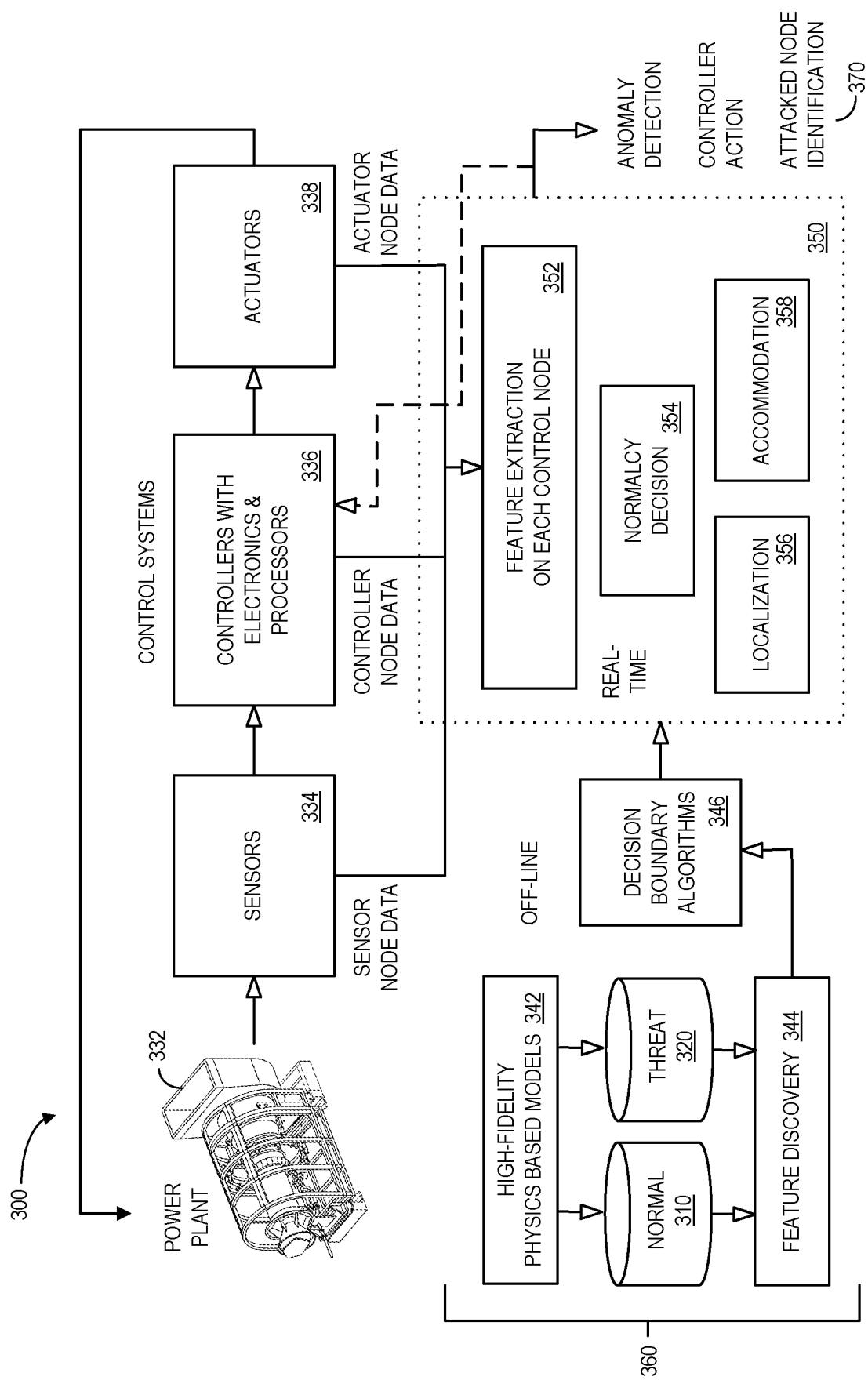
FIG. 3 is threat alert system in accordance with some embodiments.

A cyber-attack detection and localization algorithm may process a real-time turbine signal data stream and then compute features (multiple identifiers) which can then be compared to the sensor specific decision boundary. A block diagram of a system 300 utilizing a sensor specific gas turbine cyber-attack detection and localization algorithm according to some embodiments is provided in FIG. 3. In particular, a power plant 332 provides information to sensors 334 which helps controllers with electronics and processors 336 adjust actuators 338. A threat detection system 360 may include one or more high-fidelity physics based models 342 associated with the power plant 332 to create normal data 310 and/or threat data 320. The normal data 310 and threat data 320 may be accessed by a feature discovery component 344 and processed by decision boundary algorithms 346 while off-line (e.g., not necessarily while the power plant 332 is operating). The decision boundary algorithms 346 may generate a threat model including decision boundaries for various monitoring nodes. Each decision boundary may separate two data sets in a high dimensional space which is constructed by running a binary classification algorithm, such as a support vector machine using the normal data 310 and threat data 320 for each monitoring node signal (e.g., from the sensors 334, controllers 336, and/or the actuators 338).

A real-time threat detection platform 350 may receive the boundaries along with streams of data from the monitoring nodes. The platform 350 may include a feature extraction on each monitoring node element 352 and a normalcy decision 354 with an algorithm to detect attacks in individual signals using sensor specific decision boundaries, as well rationalize attacks on multiple signals, to declare which signals were attacked, and which became anomalous due to a previous attack on the system via a localization module 356. An accommodation element 358 may generate outputs 370, such as an anomaly decision indication (e.g., threat alert signal), a controller action, and/or a list of attached monitoring nodes.

During real-time detection, contiguous batches of control signal data may be processed by the platform 350, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 338 and then manifested in the sensor 334 data. Attack assessments might be performed in a post decision module (e.g., the localization element 356) to isolate whether the attack is related to the sensor, controller, or actuator (e.g., indicating which part of the monitoring node). This may be done by individually monitoring, overtime, the location of the feature vector with respect to the decision boundary. For example, when a sensor 334 is spoofed, the attacked sensor feature vector will cross the decision boundary earlier than the rest of the vectors as described with respect to FIGS. 4 through 6. If a sensor is declared to be anomalous, and the load command to the auxiliary equipment is later determined to be anomalous, it may be determined that the original attack, such as signal spoofing, occurred on the sensor 334. Conversely, if the signal to the auxiliary equipment was determined to be anomalous first, and then later manifested in the sensor 334 feedback signal, it may be determined that the signal to the equipment was initially attacked.

According to some embodiments, it may be detected whether or not a signal is in the normal operating space (or abnormal space) through the use of localized decision boundaries and real time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 4:
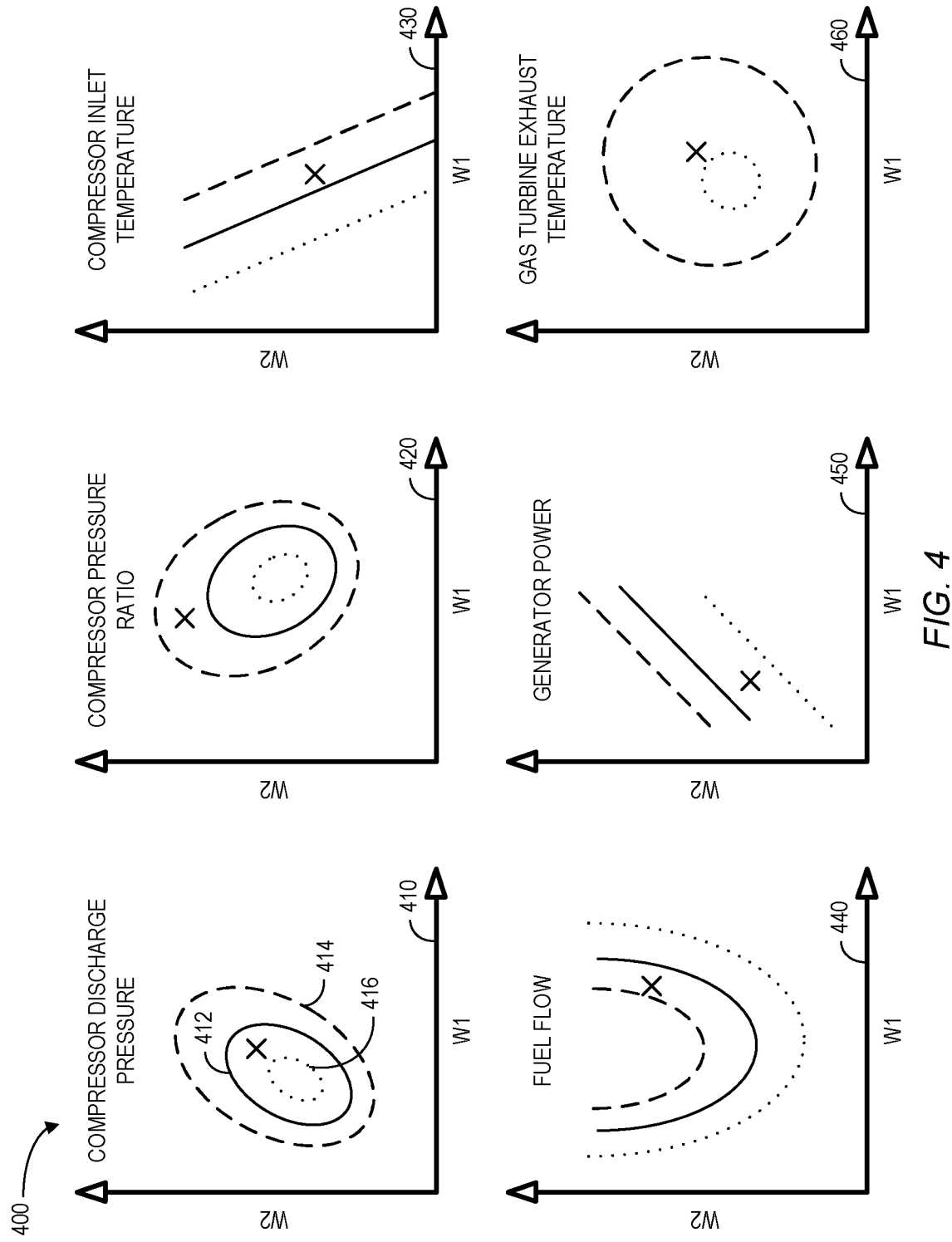
FIGS. 4 through 6 illustrate boundaries and feature vectors for various monitoring node parameters according to some embodiments.

FIG. 4 illustrates 400 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge temperature 410, compressor pressure ratio 420, compressor inlet temperature 430, fuel flow 440, generator power 450, and gas turbine exhaust temperature 460. Each graph includes an average boundary 412 (solid line), minimum boundary 414 (dotted line), and maximum boundary 416 (dashed line) and an indication associated with current feature location for each monitoring node parameter (illustrated with an "X" on the graph). As illustrated in FIG. 4, the current monitoring node location is between the minimum and maximum boundaries (that is, the "X" is between the dotted and dashed lines). As a result, the system may determine that the operation of the industrial asset control system is normal (and no threat is being detected indicating that the system is currently under attack).

Figure 5:
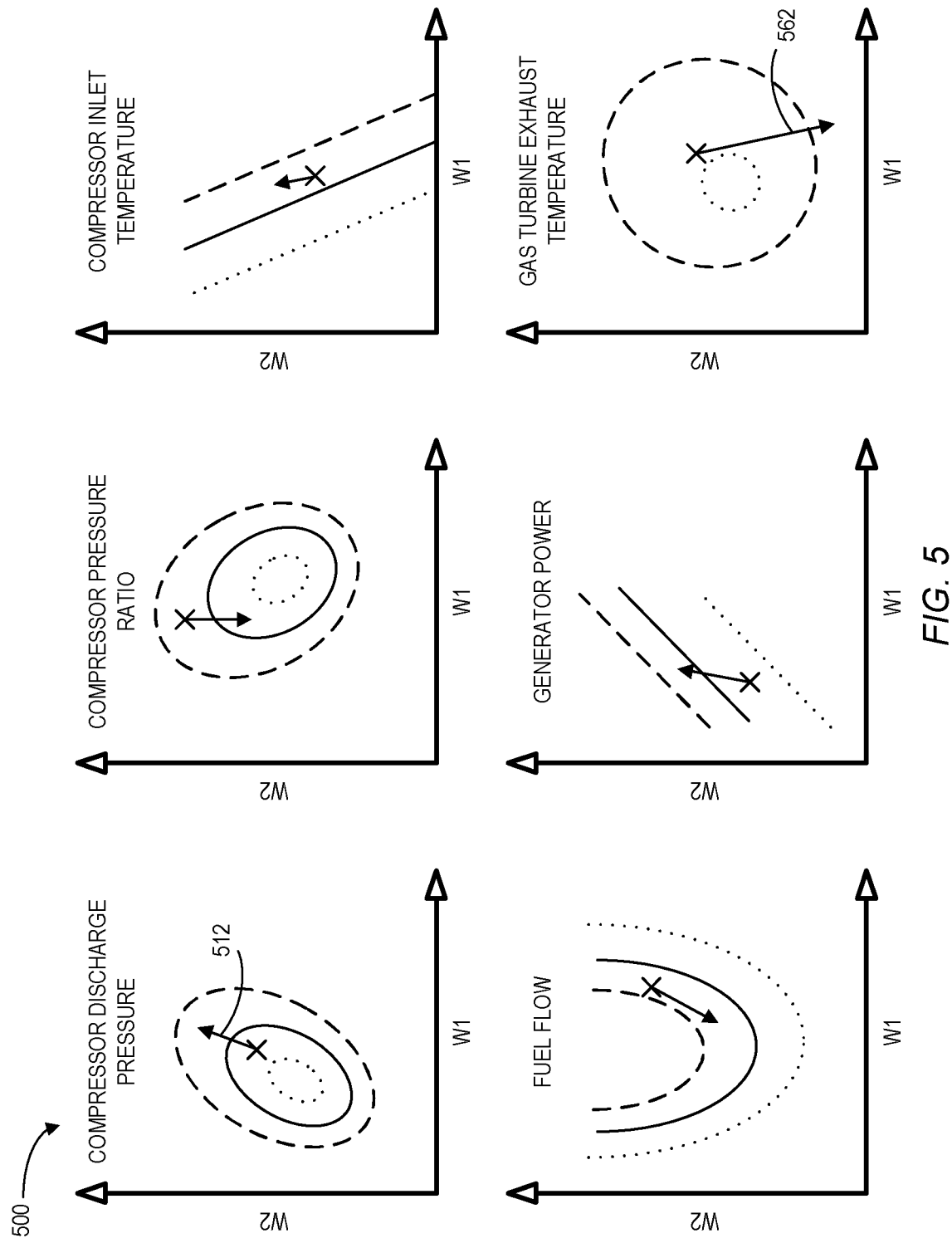

FIG. 5 illustrates 500 subsequent boundaries and feature vectors for these parameters. Consider, for example, a feature vector movement 512 for the compressor discharge pressure. Even though feature vector 512 has moved, it is still within the maximum and minimum boundaries and, as a result, normal operation of that monitoring node may be determined. This is the case for the first five graphs in FIG. 5. In this example, a feature vector movement 562 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary control signal illustrated in FIG. 5 moves 562 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 5, assume that the gas turbine exhaust temperature signal was attacked. This may cause the system to respond in such a way so as to put other signals into an abnormal state. This is illustrated 600 in FIG. 6, where the attack has already been detected and now other signals shown to be abnormal. In particular, feature movement for the compressor discharge pressure 612, compressor pressure ratio 622, compressor inlet temperature 632, and fuel flow 642 have all become abnormal (joining the feature vector for the gas turbine exhaust temperature 662). Note that the feature vector for generator power did not become abnormal. In order to decide whether or not these signals 612, 622, 632, 642 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to FDIA (which itself is very limited). The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running Design of Experiments ("DoE") experiments on high-fidelity models. A data set for each sensor might comprise a feature vector for given threat values (e.g., turbine speed, thermocouple scale factor, etc.). Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 6:
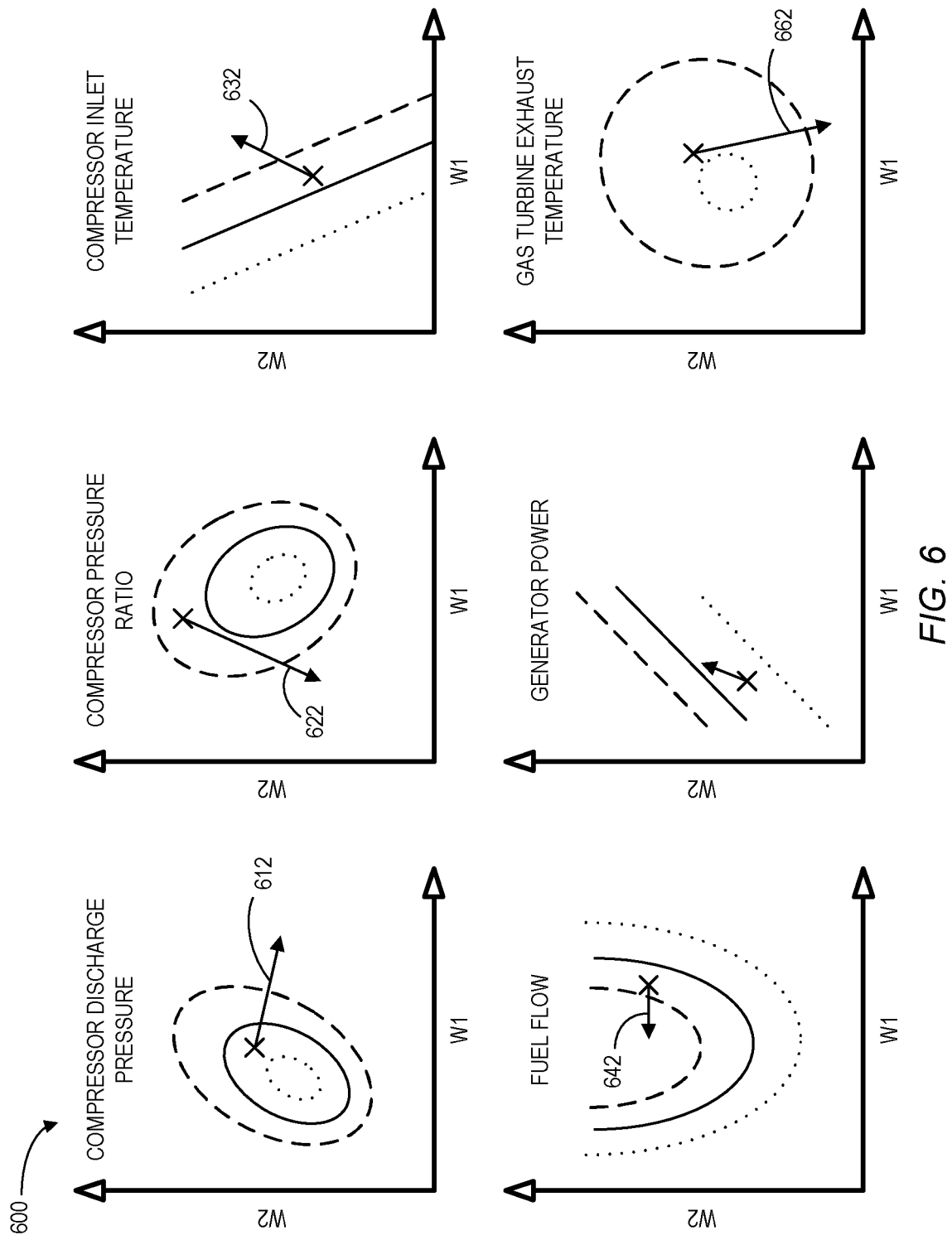

In some cases, multiple vector properties might be examined, and the information described with respect to FIGS. 4 through 6 may be processed to determine if the signal had been trending in a specific direction as the attack was detected (or if it had just been moving due to noise). Had the signal been uniformly trending as the attack took place and afterward, then this signal is a response to the original attack and not an independent attack.

Figure 7:
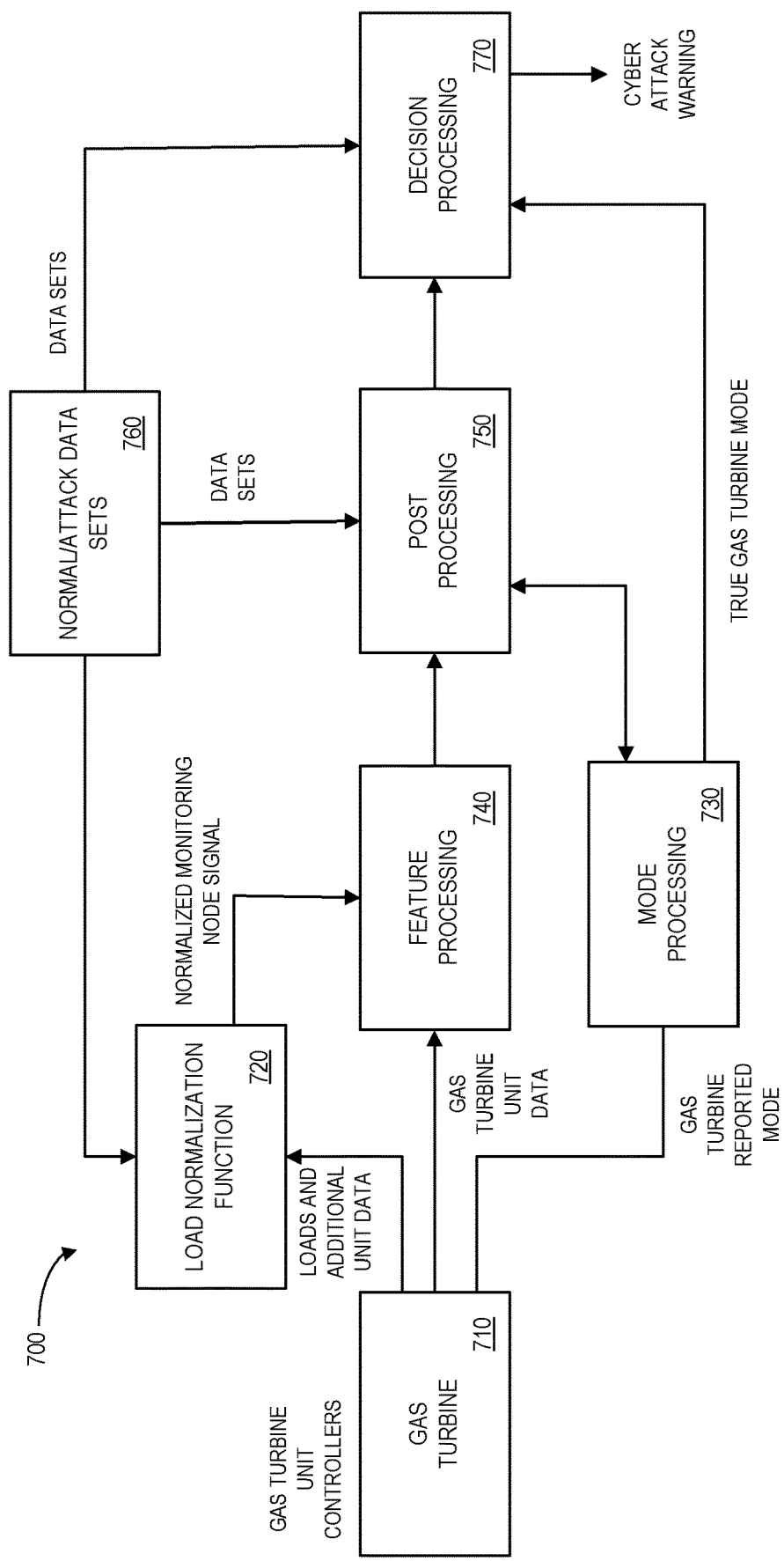
FIG. 7 illustrates a block diagram view of a cyber-attack detection system in accordance with some embodiments.

Note that an industrial asset control system may be associated with non-linear operations over a range of operating parameters (e.g., loads, temperatures, etc.). As a result, data variations can be substantial and determining when a cyber threat is present based on operation of the control system may be difficult. FIG. 7 illustrates a block diagram view of a cyber-attack detection system 700 in accordance with some embodiments. In particular, the system 700 illustrates a gas turbine 710 (e.g., associated with gas turbine unit controllers) that transmits information about loads (e.g., gas turbine loads, Adaptive Real-time Engine Simulation ("ARES" loads, etc.) to a load normalization function 720. The gas turbine 710 may also transmit information, to mode processing 730 (e.g., a gas turbine reported mode of operation) and feature processing 740 (e.g., gas turbine unit data). As will be described, the load normalization function 720 (e.g., associated with $S_{nominal}$ and $\overline{S}_{nominal}$ values) may transmit a normalized monitoring node signal (e.g., associated with $S_{normalized}$) to feature processing 740. Post processing 750 may receive information from feature processing 740 and transmit data to decision processing 770 (which can automatically create a cyber-attack warning based at least in part on data sets received from a normal/attack data sets storage unit 760. Thus, some embodiments may compute normalized monitoring node signals dynamically based on turbine load or temperature levels and temporal time-series signals. This normalization may provide capabilities to perform attack detection for different load conditions.

Note that embodiments might utilize temporal and/or spatial normalization. Temporal normalization may provide normalization along a time axis. Spatial normalization may be used to normalize signals along multiple nodes (e.g., sensor axis). In either case, the normalized signals may then be used to perform attack detection using feature extraction and comparisons to normal decision boundaries. Sensor, actuator, and control node time-series data may be processed in substantially real-time to extract "features" from this data. The feature data may then be compared to a decision boundary to determine if a cyber-attack has occurred to the system. A similar approach may be used for detecting attacks in spatially normalized data.

The processing of the real-time data may utilize the normal operating point of the gas turbine 710. This normal operating point might be determined, for example, based on system operating modes, external conditions, system degradation factor, fuel input, etc. The real-time measured sensor data, actuator data, and control nodes may be processed such that a difference between actual and nominal values is computed and this difference, or delta, is normalized with the expected operating conditions coefficients. Note that turbine load level (e.g., as represented by Mega Watts ("MW")) may be computed based on multiple measurements, and a load may be estimated from an adaptive real time engine model.

According to some embodiments, the following may be performed off-line (not real time). For a given turbine mode, the gas turbine 710 operation may be simulated using high fidelity models. The load level may be changed from a lowest operating point to a highest operating point (e.g., using step changes every predefined time interval). This simulated data produces a number of normal running data files at varying load levels. Taking one of these files, the load level may be averaged and categorized into a pre-defined load level resolution (e.g., averaged to the nearest 0.25 MW). Using these normalization packets as an input to processing of the time series signals may facilitate dynamic normalization when running in real time. These outputs from the dynamic normalization process may then be then used in a feature discovery process.

According to some embodiments, the normalization coefficients are used for a cyber-attack detection system. Note that embodiments may determine a normal operating point for an industrial asset control system. For example, turbine load level might be a good indicator when the system is operating at a pre-selected load mode. If a temperature mode is used, then normalization may be carried out at the normal temperature as the operating point. This operating point may be used as an input to a dynamic look-up table (and the output of the table may be a normal operating point for the selected load).

Note that feature extraction may process sensor data into feature discovery algorithms (e.g., via a principal component analysis). When principal components are used as features, weights may represent features in reduced dimensions. Consider, for example, temporal normalization of sensor/actuator/control node data (S) performed as follows at every sample along a time axis:

$$S_{normalized} = \frac{S_{nominal} - S_{original}}{\overline{S}nominal}$$

where $\overline{S}_{nominal}$ is a temporal average of a time series signal for normal operating conditions. In this case, a temporal average might be computed for a batch length (e.g., 45 seconds). Note that $S_{original}$ may represent the time series data that require normalization, and $S_{nominal}$ may represent a time series signal for a nominal operating condition. Spatial normalization of sensor/actuator/control node data (S) might be performed at every sample along the sensor axis using the above equation, but with following definition of terms: $\overline{S}_{nominal}$ may represent a spatial average of multiple node signals for nominal conditions along the node axis. There may be, for example, 40 or more nodes involved along the node axis. The spatial average may be computed across multiple nodes for a given sample time or averaged across multiple nodes and across a window of batch length (e.g., 45 seconds across 50 monitoring nodes or 40 milliseconds across 50 nodes). In the spatial normalization, $\overline{S}_{nominal}$ may represent a spatio-temporal average. In this case, $S_{original}$ is the node data that require normalization. Spatio-temporal normalization may also be thought of in two dimensions in which normalized S is a matrix with rows representing spatial axis and columns representing time axis.

The normalized output, $S_{normalized}$ may be expressed as a weighted linear combination of basis functions when certain features are used.

$$S = S_0 + \sum_{j=1}^{N} w_j \Psi_j$$

where $S_0$ is an average sensor output with threats, $w_j$ is the $j^{th}$ weight, and $\Psi_j$ is the $j^{th}$ basis vector. When other knowledge-based, shallow or learning features are used, the normalized output may be further processed to extract corresponding features. To find $S_{nominal}$ under varying load transients, power levels, ambient conditions, fuel conditions, and/or machine life degradation parameters consider the following:

Turbine load transients can change the gas turbine load by up to 10% per minute. Power levels can change dramatically during the sample time period;

Turbine ambient operating conditions [temperature, pressure, humidity] effect power output and sensor outputs;

Fuel conditions (lower heating value) effect energy content of fuel and impacts sensor readings;

machine life degradation (compressor flow scaling, efficiency, turbine flow scalar, efficiency) all effect sensor measurements; and Turbine operating mode may impact a nominal operating point.

Note that the nominal operating conditions may be stored in data tables based on load, ambient conditions, machine performance, etc. The turbine mode, external conditions, fuel input, etc. may then be used as inputs to this selection logic. The tables may be dynamically updated based on machine performance, and the table update may be performed online or offline via preselected logic. According to some embodiments, the turbine digital simulation model may be used to update these tables (e.g., to help account for machine performance and degradation). Turbine load may be used as a main input to the table algorithm. The load may be measured via sensors and used in selection logic to output a load estimate. According to some embodiments, an adaptive real time engine model estimate may be used in addition to measurements to provide a robust surrogate of load.

A turbine measured load condition might be measured in real-time over a time horizon window. A sub-window of data may be used to compute an average load over this sub-window. This averaged power level in MW may then be quantized and used as a table input. Note that a cyber-attack algorithm may utilize a nominal sensor/actuator/control node operating point. Examples of sensors include: turbine Inlet temperature, turbine inlet pressure, turbine power, turbine speed, compressor discharge pressure, compressor discharge temperature, fuel flow, and/or turbine exhaust temperature. These nominal points can then be stored in tables (with the table input representing an estimated power level).

Figure 8:
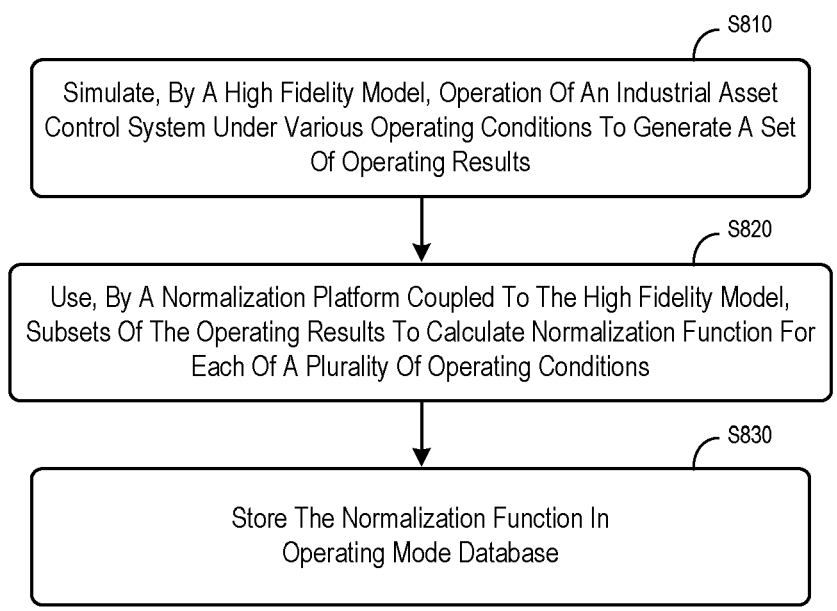
FIG. 8 is an off-line, non-real time, method according to some embodiments.

FIG. 8 is an off-line, non-real time, method according to some embodiments. At S810, a high fidelity model may simulate operation of an industrial asset control system under various operating conditions to generate a set of operating results. According to some embodiments, the system may monitor the operation of the industrial asset control system (e.g., instead of simulation operation). At S820, a normalization platform coupled to the high fidelity model may use subsets of the operating results to calculate a normalization function (e.g., associated with normalized signals) for each of a plurality of operating conditions. An operating mode database may then be used to store the normalization function and/or normalized signals at S830.

Figure 9:
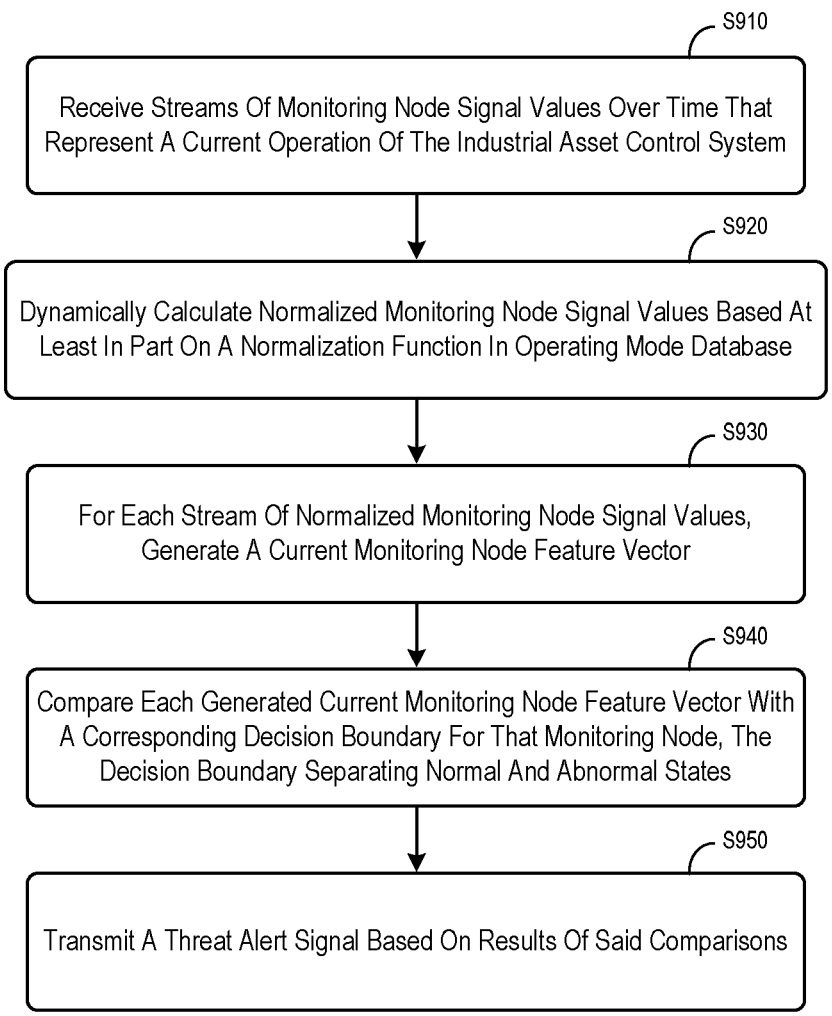
FIG. 9 is a real-time, dynamic method in accordance with some embodiments.

FIG. 9 is a real-time, dynamic method in accordance with some embodiments. At S910, a plurality of real-time monitoring node signal inputs may receive streams of monitoring node signal values over time that represent a current operation of the industrial asset control system. At S920, a threat detection computer platform, coupled to the plurality of real-time monitoring node signal inputs and the operating mode database, may receive the streams of monitoring node signal values and dynamically calculate normalized monitoring node signal values based at least in part on a normalization function in the operating mode database. For each stream of normalized monitoring node signal values, the system may generate a current monitoring node feature vector at S930. Note that the current monitoring node feature vectors may be associated with dynamic temporal normalization and/or dynamic spatial normalization.

At S940, the system may compare each generated current monitoring node feature vector with a corresponding decision boundary for that monitoring node (the decision boundary separating a normal state from an abnormal state for that monitoring node). At S950, the system may automatically transmit a threat alert signal based on results of said comparisons. The alert signal might be transmitted, for example, via a cloud-based application. According to some embodiments, the alert signal may be transmitted via one or more of a cloud-based system, an edge-based system, a wireless system, a wired system, a secured network, and a communication system.

By way of example only, the industrial asset control system might be associated with a gas turbine. In this case, the operating conditions might be associated with gas turbine loads and/or gas turbine temperatures. Other gas turbine parameters might include: (i) an operating mode, (ii) an external condition, (iii) a system degradation factor, (iv) fuel input, (v) a turbine inlet temperature, (vi) a turbine inlet pressure, (vii) a turbine power, (viii) a turbine speed, (ix) compressor discharge pressure, (x) compressor discharge temperature, (xi) fuel flow, and/or (xii) turbine exhaust temperature. As another example, the industrial asset control system might be associated with a computer network and the operating conditions may be associated with information packet transmission characteristics (e.g., packet size, latency, etc.).

Figure 10:
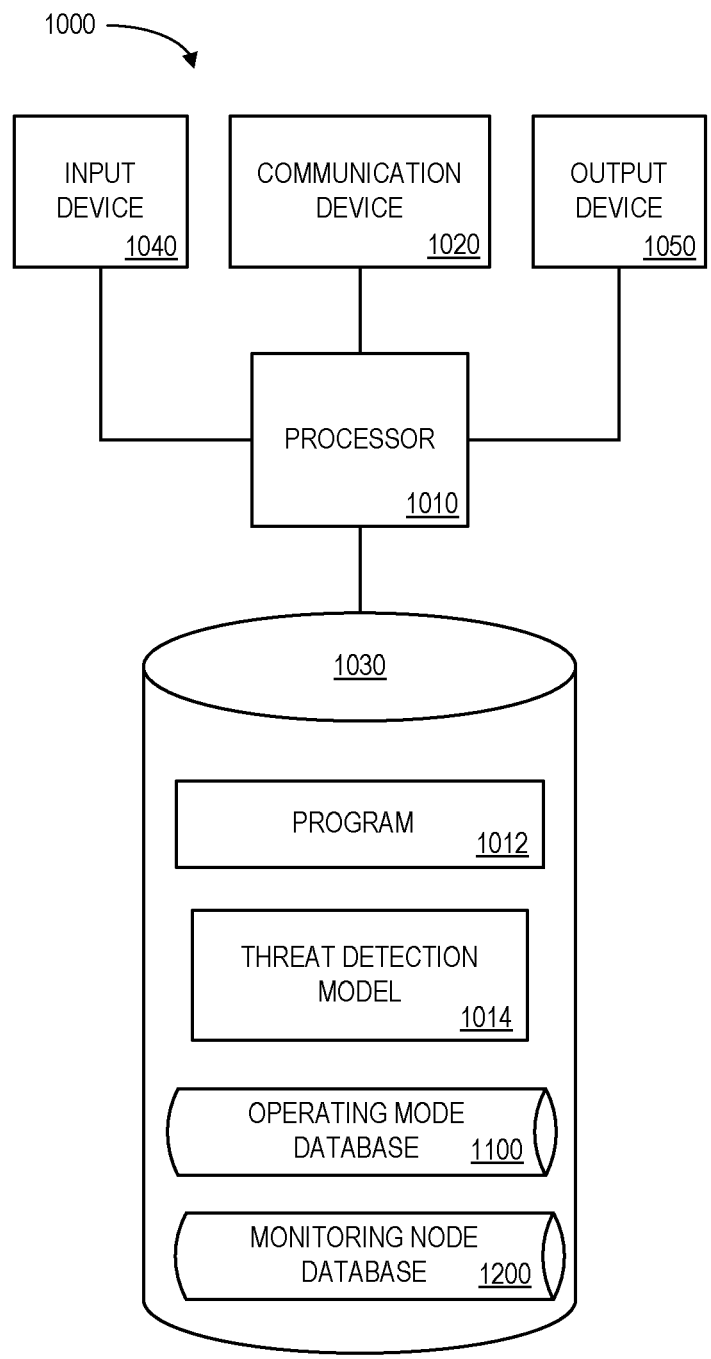
FIG. 10 is a block diagram of an industrial asset control system protection platform according to some embodiments of the present invention.

The embodiments described herein may be implemented using any number of different hardware configurations. For example, FIG. 10 is a block diagram of an industrial asset control system protection platform 1000 that may be, for example, associated with the system 100 of FIG. 1. The industrial asset control system protection platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote monitoring nodes, user platforms, etc. The industrial asset control system protection platform 1000 further includes an input device 1040 (e.g., a computer mouse and/or keyboard to input adaptive and/or predictive modeling information) and/an output device 1050 (e.g., a computer monitor to render a display, provide alerts, transmit recommendations, and/or create reports). According to some embodiments, a mobile device, monitoring physical system, and/or PC may be used to exchange information with the industrial asset control system protection platform 1000.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or a threat detection model 1014 for controlling the processor 1010. The processor 1010 performs instructions of the programs 1012, 1014, and thereby operates in accordance with any of the embodiments described herein. For example, the processor 1010 may monitor operation of an industrial asset control system and/or simulate operation of the industrial asset control system under various operating conditions to generate a set of operating results. Subsets of the operating results may be used by the processor 1010 to calculate a normalization function for each of a plurality of operating conditions. Streams of monitoring node signal values over time may be received by the processor 1010 that represent a current operation of the industrial asset control system. The processor 1010 may then dynamically calculate normalized monitoring node signal values based at least in part on a normalization function in the operating mode database. For each stream of normalized monitoring node signal values, a current monitoring node feature vector may be generated by the processor 1010 and compared with a corresponding decision boundary for that monitoring node, the decision boundary separating normal and abnormal states for that monitoring node. A threat alert signal may then be automatically transmitted by the processor 1010 based on results of said comparisons.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the industrial asset control system protection platform 1000 from another device; or (ii) a software application or module within the industrial asset control system protection platform 1000 from another software application, module, or any other source.

In some embodiments (such as the one shown in FIG. 10), the storage device 1030 further stores an operating mode database 1100 and a monitoring node database 1200. Example of databases that may be used in connection with the industrial asset control system protection platform 1000 will now be described in detail with respect to FIGS. 11 and 12. Note that the database described herein is only one example, and additional and/or different information may be stored therein. Moreover, various databases might be split or combined in accordance with any of the embodiments described herein.

Figure 11:
FIG. 11 is a tabular portion of an operating mode database in accordance with some embodiments.

Referring to FIG. 11, a table is shown that represents the operating mode database 1100 that may be stored at the industrial asset control system protection platform 1000 according to some embodiments. The table may include, for example, entries identifying normal operating conditions associated with an industrial asset control system. The table may also define fields 1102, 1104, 1106, 1108, 1110 for each of the entries. The fields 1102, 1104, 1106, 1108, 1110 may, according to some embodiments, specify: a monitoring node identifier 1102 and associated model, a time series of data values 1104, an average value 1106, an operating condition 1108, and a normalization function 1110. The monitoring node database 1100 may be created and updated, for example, offline (non-real time) when a new physical system is monitored or modeled.

The monitoring node identifier 1102 may be, for example, a unique alphanumeric code identifying a node to be monitored (e.g., associated with a sensor) and the model might indicate, for example, a high fidelity computer simulation of the asset being monitored. The time series of data values 1104 might be a batch result from that computer simulation model and the average value 1106 may be computed to determine a "normal" operating condition of the asset under certain conditions (e.g., generator load or temperature). The operating condition 1108 might indicate the conditions (e.g., load or temperature) utilized by the computer simulations, and the normalization function 1110 may be used to calculate normalized feature vectors (e.g., in substantially real time).

Figure 12:
FIG. 12 is a tabular portion of a monitoring node database according to some embodiments.

Referring to FIG. 12, a table is shown that represents the monitoring node database 1200 that may be stored at the industrial asset control system protection platform 1000 according to some embodiments. The table may include, for example, entries identifying monitoring nodes associated with a physical system. The table may also define fields 1202, 1204, 1206, 1208, 1210 for each of the entries. The fields 1202, 1204, 1206, 1208, 1210 may, according to some embodiments, specify: a monitoring node identifier 1202, monitoring node values 1204, a current feature vector 1206, a decision boundary 1208, and a result 1210. The monitoring node database 1200 may be created and updated, for example, when a new physical system is monitored or modeled, monitoring nodes report values, operating conditions change, etc.

The monitoring node identifier 1202 may be, for example, a unique alphanumeric code identifying a monitoring node in an industrial asset control system, such as a sensor node that detects the series of monitoring node values 1204 over time (e.g., in batches of 30 to 50 seconds of data). The monitoring node values 1204 may be used to create the current feature vectors 1206. The decision boundary 1208 might be a high-dimensional decision boundary 1208 separating normal operation of an industrial asset from abnormal operation. The result 1210 (e.g., normal or alert indicating a potential threat) might be generated by comparing the current feature vector 1208 with the decision boundary 1210.

Thus, embodiments may enable the passive detection of indications of multi-class abnormal operations using real-time signals from monitoring nodes. Moreover, the detection framework may allow for the development of tools that facilitate proliferation of the invention to various systems (i.e., gas turbines, steam turbines, wind turbines, aviation engines, locomotive engines, power grid, etc.) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset control system operators so that an attack may be thwarted (or the effects of the attack may be blunted), reducing damage to equipment.

Note that cyber security is an important function required in the protection of assets, such as power plant equipment. Dynamic normalization in this space may improve the resolution of detection. The machines associated with industrial assets can be very complex, and embodiments described herein may permit an implementation of a cyber security algorithm that makes detections fast and reliably. Note that a Receiver Operating Conditions ("ROC") curve might be used to evaluate the use of dynamic normalization for load fluctuations (e.g., including indications of true and false positive detections, true and false negative detections, etc.).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
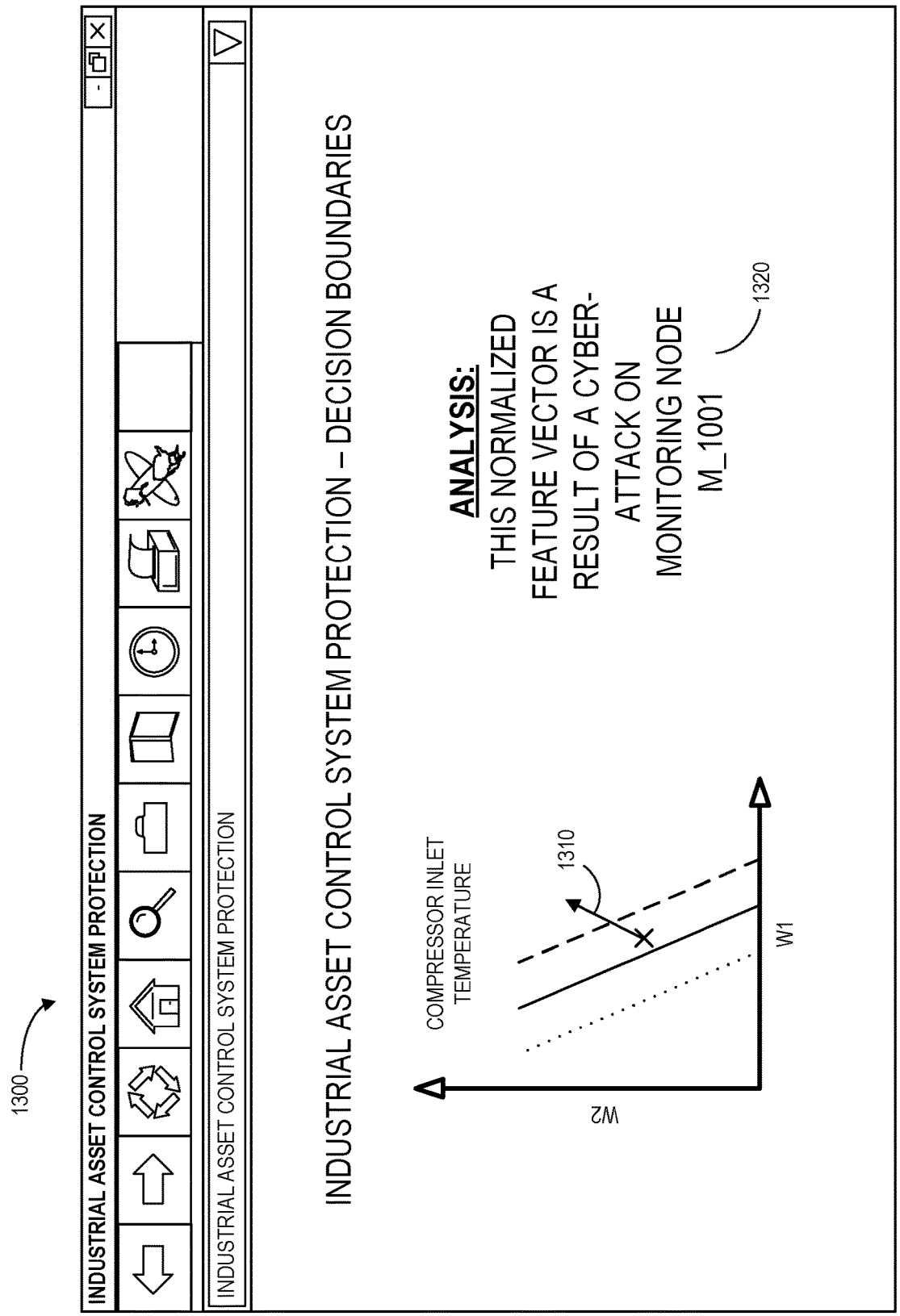
FIG. 13 is a display according to some embodiments.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as damns, the power grid, military devices, etc. Moreover, note that some embodiments may be associated with a display of monitoring node threat data to an operator. For example, FIG. 13 illustrates an interactive Graphical User Interface ("GUI") display 1300 that might display monitoring node information (e.g., including a normalized current feature vector and decision boundaries) along with an automatically generated analysis 1320 of the data. According to some embodiments, information about attack statuses may be interwoven between different industrial asset plants. For example, one power plant might be aware of the status of other nodes (in other power plants) and such an approach might help thwart coordinated cyber-threats.

In addition to automatic threat detection, some embodiments described herein might provide systems with an additional cyber layer of defense and be deployable without custom programming (e.g., when using operating data). Some embodiments may be sold with a license key and could be incorporated as monitoring service. For example, boundaries might be periodically updated when equipment at an industrial asset plant is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset control system, comprising:
   a high fidelity model to simulate operation of the industrial asset control system under various operating conditions to generate a set of operating results;
   a normalization platform coupled to the high fidelity model to calculate a normalization function for each of a plurality of operating conditions, wherein normalization is performed as follows:

$$S_{normalized} = \frac{S_{nominal} - S_{original}}{\overline{S}_{nominal}}$$

where $\overline{S}_{nominal}$ is a spatio-temporal average for normal operating conditions, $S_{nominal}$ represents a time series signal for nominal operating conditions, and $S_{original}$ represents time series data requiring normalization;

an operating mode database to store the normalization function;

a plurality of real-time monitoring node signal inputs to receive streams of monitoring node signal values over time that represent a current operation of the industrial asset control system, wherein at least one monitoring node is associated with at least one of: an auxiliary equipment input signal, a control intermediary parameter, and a control logic value; and a threat detection computer platform, coupled to the plurality of real-time monitoring node signal inputs and the operating mode database, including:

a computer processor, and a computer memory, coupled to the computer processor, storing instructions that, when executed by the processor cause the threat detection computer platform to:

(i) receive the streams of monitoring node signal values, (ii) dynamically calculate normalized monitoring node signal values based at least in part on a normalization function in the operating mode database, (iii) for each stream of normalized monitoring node signal values, generate a current monitoring node feature vector, (iv) compare each generated current monitoring node feature vector with a corresponding decision boundary for that monitoring node, the decision boundary separating a normal state from an abnormal state for that monitoring node, and (v) automatically transmit a threat alert signal based on results of said comparisons.

2. The system of claim 1, wherein current monitoring node feature vectors are associated with dynamic temporal normalization.

3. The system of claim 1, wherein current monitoring node feature vectors are associated with dynamic spatial normalization.

4. The system of claim 1, wherein the industrial asset control system is associated with a gas turbine and the operating conditions are associated with at least one of: (i) gas turbine loads, and (ii) gas turbine temperatures.

5. The system of claim 4, wherein the operating conditions are further associated with at least one of: (i) an operating mode, (ii) an external condition, (iii) a system degradation factor, (iv) fuel input, (v) a turbine inlet temperature, (vi) a turbine inlet pressure, (vii) a turbine power, (viii) a turbine speed, (ix) compressor discharge pressure, (x) compressor discharge temperature, (xi) fuel flow, and (xii) turbine exhaust temperature.

6. The system of claim 1, wherein the industrial asset control system is associated with a computer network and the operating conditions are associated with information packet transmission characteristics.

7. The system of claim 1, wherein the normalized output $S_{normalized}$ is expressed as a weighted linear combination of basis functions as follows:

$$S = S_0 + \sum_{j=1}^{N} w_j \Psi_j$$

where $S_0$ is an average sensor output with threats, $w_j$ is the $j^{th}$ weight, and $\Psi_j$ is the $j^{th}$ basis vector.

8. The system of claim 1, wherein at least one monitoring node is associated with a plurality of decision boundaries and said comparison is performed in connection with each of those boundaries.

9. The system of claim 1, wherein the threat alert signal transmission is performed using at least one of: (i) a cloud-based system, (ii) an edge-based system, (iii) a wireless system, (iv) a wired system, (v) a secured network, and (vi) a communication system.

10. The system of claim 1, wherein the threat is associated with at least one of:

an actuator attack, a controller attack, a monitoring node attack, a plant state attack, spoofing, financial damage, unit availability, a unit trip, a loss of unit life, and asset damage requiring at least one new part.

11. A computerized method to protect an industrial asset control system, comprising:

simulating, by a high fidelity model, operation of the industrial asset control system under various operating conditions to generate a set of operating results;

calculating, by a normalization platform, a normalization function for each of a plurality of operating conditions, wherein normalization is performed as follows:

$$S_{normalized} = \frac{S_{nominal} - S_{original}}{\overline{S}nominal}$$

where $\overline{S}_{nominal}$ is a spatio-temporal average for normal operating conditions, $S_{nominal}$ represents a time series signal for nominal operating conditions, and $S_{original}$ represents time series data requiring normalization;

receiving, via a plurality of real-time monitoring node signal inputs, streams of monitoring node signal values over time that represent a current operation of the industrial asset control system, wherein at least one monitoring node is associated with at least one of: an auxiliary equipment input signal, a control intermediary parameter, and a control logic value;

dynamically calculating, by a threat detection computer platform, normalized monitoring node signal values based at least in part on a normalization function;

for each stream of normalized monitoring node signal values, generating, by the threat detection computer platform, a current monitoring node feature vector associated with at least one of: (i) dynamic temporal normalization, and (ii) dynamic spatial normalization;

comparing, by the threat detection computer platform, each generated current monitoring node feature vector with a corresponding decision boundary for that monitoring node, the decision boundary separating a normal state from an abnormal state for that monitoring node; and automatically transmitting a threat alert signal based on results of said comparisons.

12. The method of claim 11, wherein the industrial asset control system is associated with a gas turbine and the operating conditions are associated with at least one of: (i) gas turbine loads, and (ii) gas turbine temperatures.

13. A non-transient, computer-readable medium storing instructions to be executed by a processor to perform a method of protecting a gas turbine, the method comprising:

simulating operation of the industrial asset control system under various gas turbine loads and gas turbine temperatures to generate a set of operating results;

calculating a normalization function for each of a plurality of gas turbine loads and gas turbine temperatures, wherein normalization is performed as follows:

$$S_{normalized} = \frac{S_{nominal} - S_{original}}{\overline{S}nominal}$$

where $\overline{S}_{nominal}$ is a spatio-temporal average for normal gas turbine loads and gas turbine temperatures, $S_{nominal}$ represents a time series signal for nominal gas turbine loads and gas turbine temperatures, and $S_{original}$ represents time series data requiring normalization;

receiving streams of monitoring node signal values over time that represent a current operation of the gas turbine, wherein at least one monitoring node is associated with at least one of: an auxiliary equipment input signal, a control intermediary parameter, and a control logic value;

dynamically calculating normalized monitoring node signal values based at least in part on a normalization function in the operating mode database;

for each stream of normalized monitoring node signal values, generating a current monitoring node feature vector;

comparing each generated current monitoring node feature vector with a corresponding decision boundary for that monitoring node, the decision boundary separating a normal state from an abnormal state for that monitoring node; and automatically transmitting a threat alert signal based on results of said comparisons.

14. The medium of claim 13, wherein current monitoring node feature vectors are associated with at least one of: (i) dynamic temporal normalization, and (ii) dynamic spatial normalization.

15. The medium of claim 13, wherein at least one monitoring node is associated with a plurality of decision boundaries and said comparison is performed in connection with each of those boundaries.

* * * * *